United States Patent [19]

Fujiwara

[11] Patent Number: 5,019,467
[45] Date of Patent: May 28, 1991

[54] THIN PRIMARY CELL

[75] Inventor: Yasuo Fujiwara, Urawa, Japan

[73] Assignee: Kimoto & Co., Ltd., Japan

[21] Appl. No.: 377,741

[22] Filed: Jul. 10, 1989

Related U.S. Application Data

[63] Continuation of Ser. No. 196,623, May 19, 1988, abandoned.

[30] Foreign Application Priority Data

Nov. 13, 1987 [JP] Japan .................. 62-286922

[51] Int. Cl.$^5$ ............................................. H01M 6/18
[52] U.S. Cl. .................................... 429/127; 429/192; 429/162; 29/623.5
[58] Field of Search ............... 429/127, 162, 152, 192, 429/124; 29/623.5

[56] References Cited

U.S. PATENT DOCUMENTS

| | | |
|---|---|---|
| Re. 31,532 | 3/1984 | Schneider et al. |
| 4,172,319 | 10/1979 | Bloom et al. ............. 429/152 |
| 4,195,121 | 3/1980 | Peterson ................... 429/127 |
| 4,299,890 | 11/1981 | Rea et al. .................. 429/124 |
| 4,471,037 | 9/1984 | Bannister ................... 429/192 |
| 4,556,614 | 12/1985 | le Mehaute et al. |
| 4,614,695 | 9/1986 | Ibbott ....................... 429/127 |
| 4,645,726 | 2/1987 | Hiratani et al. |
| 4,728,588 | 3/1988 | Noding et al. ............. 429/127 |
| 4,749,875 | 4/1988 | Hara .......................... 429/127 |
| 4,822,701 | 4/1989 | Ballard et al. ............ 429/192 |

FOREIGN PATENT DOCUMENTS 0028628  3/1977  Japan ........................... 429/127

Primary Examiner—Donald L. Walton
Attorney, Agent, or Firm—Lorusso & Loud

[57] ABSTRACT

A thin primary cell formed with a combination of a positive current collection layer, a positive active layer, a solid polyelectrolyte layer and a thin metallic film layer which are successively laminated onto an insulating material. Since this thin primary cell employs a solid polyelectrolyte as an electrolyte, it is not only free from liquid leakage but also formable on a film or sheet.

6 Claims, 6 Drawing Sheets

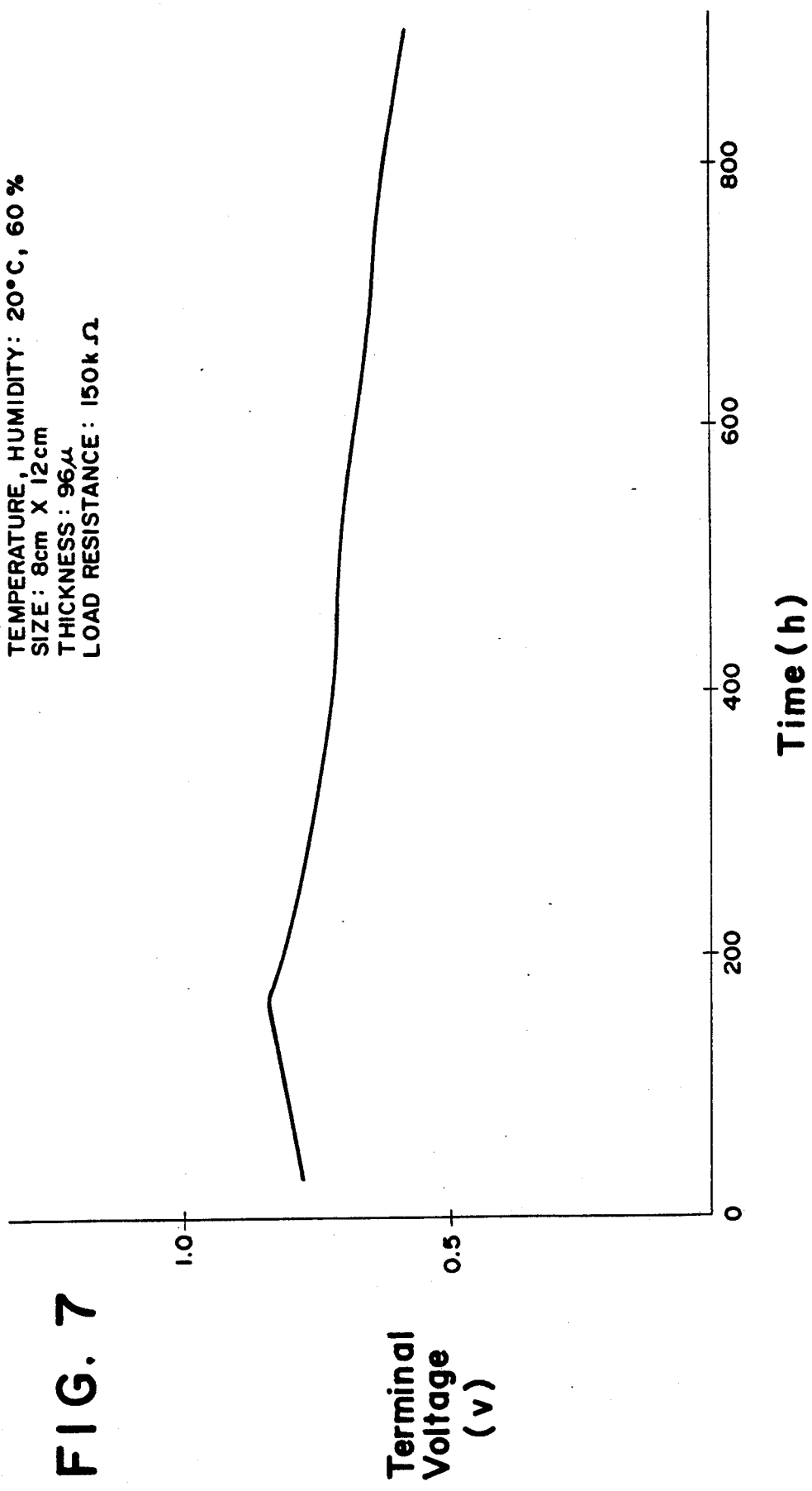

THIN PRIMARY CELL

This application is a continuation of application Ser. No. 07/196,623, filed May 19, 1988.

BACKGROUND OF THE INVENTION

1. Field of the Invention

The present invention relates to a thin film primary cell utilizing a solid polyelectrolyte.

2. Related Art Statement

According to the JIS (Japanese Industrial Standard), conventional primary cells are broadly classified into three groups: manganese dry cells (JISC8501-1984), alkaline primary cells (JISC8511-1985) and manganese dioxide lithium primary cells (JISC8512-1982). The latter two primary cells have increasingly become universally used in various applications as button- or coin-shaped thin cell power sources for cameras, electronic calculators, IC cards, etc.

Typical electrolytes employed in these prior art primary cells include: zinc chloride used in manganese dry cells; potassium hydroxide used in alkaline primary cells; and organic electrolytes and thionyl chloride used in manganese dioxide lithium primary cells. However, all such primary cells have a serious safety problem because all of the above electrolytes are liquid and therefore susceptable to leakage.

Moreover, primary cells of the types described above are constructed to seal in the liquid electrolyte and the requirement for such liquid seals has limited reduction of thickness of such cells. Because of that limitation, it remains impossible to reduce the thickness of the battery to 0.05 mm or less. A thickness of 0.05 mm or less is desirable in batteries for liquid crystal displays, watches, electronic calculators, IC cards, earphone radios, music box cards, temperature sensors, hearing aids, electronic floats for fishing, electronic thermometers, IC lighters, LEDs, pressure-sensitive buzzers, etc. in which conventional thin cells are employed.

Cells having a solid polymeric electrolyte are described in U.S. Pat. No. 4,556,614 but the thickness of the described cells is in excess of 0.05 mm. Those cells are of a fixed shape and have no flexibility. Accordingly, the scope of their usefulness is limited.

SUMMARY OF THE INVENTION

The above-described drawbacks in the prior art apparatus have been successfully eliminated by the present invention.

An object of the present invention is to provide an extremely thin primary cell of ensured safety by employing a solid polyelectrolyte to free such a primary cell from the problem of liquid leakage.

Another object of the present invention is to provide a thin film primary cell formed with laminated electrode and electrolyte layers on a substrate film or sheet to provide excellent flexibility, thus enabling a wide range of applications and easy fabrication at low production cost.

Because the components of the present invention are coatings of extreme thiness the flexibility of the whole cell approximates that of the substrate, i.e. the flexibility of the cell and that of the substrate are almost the same.

The thin primary cell according to the present invention is prepared by successively coating a positive current collection layer, a positive active substance layer, a solid polyelectrolyte layer and a thin metallic film layer onto a thin insulating substrate.

These and other objects of the invention will become apparent from the following description when taken together with the drawings.

BRIEF DESCRIPTION OF THE DRAWINGS

FIGS. 2 to 7 are discharge characteristic diagrams for the cells of the working examples 1 to 8.

DETAILED DESCRIPTION OF PREFERRED EMBODIMENTS

The present invention will be further illustrated by the detailed description and working examples to follow below but the invention is not limited to such examples, the scope of the invention being indicated by the appended claims.

Figure 1:
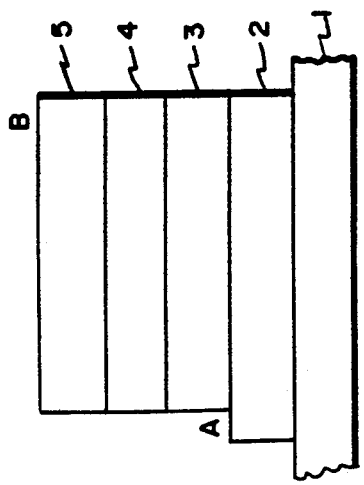
FIG. 1 is a schematic sectional view of an embodiment of the invention.

An embodiment of the present invention is illustrated in FIG. 1 wherein the numeral 1 designates the flexible insulating substrate, 2 designates the current collection layer, 3 designates the cathode referred to herein as the "positive active layer", 4 designates the solid polyelectrolyte layer and 5 designates the anode referred to herein as the "metallic film layer" or "negative electrode."

In the compositions of the present invention, the flexible insulating material 1 is preferably fiberglass, wood, plastic, ceramic, or paper and, more preferably, a plastic film or sheet which is able to provide flexibility and sufficient strength as a support. Exemplary plastics are polyethylene terephthalate, polycarbonate, polyimide, polyether ketone, polyether ether-ketone, polyether sulfone, polyphenylene sulfide, polypropylene, polystyrene, polyvinyl chloride, cellulose, etc.

The positive current collection layer 2 is formed of carbon or a metallic oxide. When carbon is used as the positive (cathode) current collector it is in the form of carbon grains, carbon fibers or graphite dispersed in a polymeric matrix. Examples of a suitable metallic oxide are ITO (Indium-Tin Oxide), indium oxide, tin oxide, silver oxide, mercury oxide, copper oxide and lead dioxide. Any one of these substances may be used either alone or dispersed in a polymeric matrix.

The polymer in which the carbon or metallic oxide is optionally dispersed may be polyurethane, polybutyral, acrylic polymers, vinyl chloride-vinyl acetate copolymer, polycarbonate, ABS, Teflon, natural rubber, polyester, alkyd, polyamide, polyimide, epoxy, phenolic resin, melamine, polystyrene, acetal, nylon, polyolefin, cellulose, polyvinyl alcohol, polypropylene or polyacrylamide.

The current collector layer 2 preferably has a surface resistance of no more than $10^3 \Omega cm^{-2}$ and more preferably not more than $5 \times 10^2 \Omega cm^{-2}$, as measured by the four-terminal method, so as to provide a suitably high current collection capacity. Where layer 2 has a polymeric matrix the content of carbon or metallic oxide in the polymeric matrix is preferably such as to provide a surface resistance within the aforementioned ranges.

The positive active layer 3 may be formed of a polymeric matrix with a positive acting substance, e.g. manganese dioxide, dispersed therein.

As in the case of the current collection layer, the polymeric matrix for the positive active layer 3 may be polyurethane, polybutyral, acrylic polymers, vinyl chloride-vinyl acetate copolymer, polycarbonate, ABS resin, Teflon, natural rubber, polyester, alkyd, polyamide, polyimide, epoxy resin, phenolic resin, melamine resin, polystyrene, polyacetal, nylon, polyolefin, cellulose, polyvinyl alcohol, polypropylene or polyacrylamide. When manganese dioxide is the positive active substance, its weight is preferably more than 50% and not less than 80% of the total weight of layer 3 so as to provide cell capacity and physical properties for practical use.

The solid polyelectrolyte layer 4 is composed of a continuous phase of a solid non-crystalline polymer and a solid alkali metal salt dispersed in the polymer as a non-continuous phase.

The non-crystalline polymer is a polymer whose glass point is less than 10° C. and which has active molecular motion at room temperature. Such polymers include polyethylene oxide (PEO), polymethoxy polyethylene glycol methacrylate, polyvinyl pyridine, polysiloxane, polypropylene oxide, segmented polyurethane, urea-polyurethane, polyphosphazene, cellulose, polystyrene and polypeptide.

For example, a polymer of a methacrylate ester conforming to the following formula I (polymethoxy polyethylene glycol methacrylate):

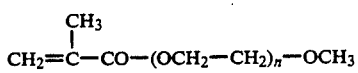

I.

(where n=integer no less than 1) provides a cell having a high energy density.

The alkali metal salt used in the solid polyelectrolyte layer is preferably a lithium salt such as $LiClO_4$, $LiBr$, $LiSCN$, $LiCl$, $LiBF_4$, $LiPF_6$, etc.

The amount of the alkali metal salt used in the solid polyelectrolyte layer will depend upon the nature of the polymer matrix but it should amount to 1-99, preferably 1-30% by weight of the total electrolyte layer.

The thin metallic film layer 5 used as a negative electrode (anode) is aluminum, lithium, zinc, or platinum and preferably lithium, aluminum or zinc. The metal is formed into a film by vacuum deposition, sputtering, ion-plating or non-electrolytic plating. The thickness of the thin metallic film layer is preferably greater than 1000 Å in order to prevent electrolytic corrosion.

Since lithium and aluminum are susceptible to oxidation, an overcoat may be provided on the thin metallic layer to prevent its oxidation.

The positive current collection layer and the active positive layer are formed by successively applying onto the insulating material liquids prepared by blending the respective solid substances forming the layers with water, alcohol, or other suitable solvents, including organic solvents and dispersants.

When a metallic oxide is used alone as a current collection layer, like the thin metallic film layer, it can be formed as a film by vacuum deposition, sputtering, ion-plating or non-electrolytic plating.

The solid polyelectrolyte layer is formed by successively applying and drying a blend of the non-crystalline polymer, the alkali metal salt and a suitable solvent for the polymer. The thin metal film is laid on the solid polyelectrolyte layer in the same manner as described above.

The dried positive current collection layer, the positive active layer and the solid polyelectrolyte layer are preferably films not more than 20μ thick and, if necessary, as thin as about 1μ. Accordingly, the thickness of a cell inclusive of a thin metal film as the uppermost layer could be less than 20μ and, if necessary, as little as 0.01 mm by selection of a proper insulating base material.

If tape-like films are used to form the insulating layer of the thin film primary cell according to the present invention, fabrication of the cell is simplified because the length of the film required may be cut off for use as occasion demands.

The present invention offers the following advantages:

the structure comprises only thin layers and the cell product is thin like a paper or a film;

the support (the insulating substrate) is a flexible film or sheet and the product itself has significant flexibility;

the product is a paper-like cell, which one can cut with a scissors or the like to any size and/or capacity required because the capacity is proportional to the size of the cell; and because the coating layers of thin primary cell themselves are the battery, the plies of the coating layers, sans the substrate, can be superimposed to obtain any desired voltage (except where current collection layer consists of only metallic oxide).

Such a primary cell, because of its high degree of flexibility and thickness of not more than 0.05 mm to roughly 0.10 mm, has high industrial value.

The great value of the thin primary cell of the present invention lies in the fact that it may be used as a power supply in a wide variety of applications such as a liquid crystal display, watch, electronic calculator or IC card, earphone radio, musical box card, temperature sensor, hearing aid, electronic float for fishing, electronic thermometer, IC lighter, LED or pressure-sensitive buzzer.

Further, the thin primary cell according to the present invention can readily be manufactured at low cost because the electrode and electrolyte layers are successively formed on a film or sheet of insulating material to complete the cell.

EXAMPLE 1

As shown in FIG. 1 a polyester film (50μ thick) was used as an insulating layer 1 and a positive current collection layer 2 was formed by applying a liquid coating using a Mayer bar and drying the film at 100° C. for 5 minutes to produce a dried film 20μ thick. The composition of the liquid coating was as follows:

Conducting carbon black (Vulcan XC-72 of Cabot Co.) 6 parts by weight
Dispersant (Roma PW of S. N Co.) 1 part by weight
Water 81 parts by weight
Aqueous polyurethane resin (Neo Rez R966 of Polyvinyl Chemical Co.) 12 parts by weight The above composition was ball-milled for 24 hours to obtain the coating fluid.

The surface resistance of the 15 cm×15 cm positive current collection layer 2 was $5 \times 10^2 \Omega cm^{-2}$ as determined by the four-terminal method.

A positive active layer 3 was formed by applying onto the positive current collection layer 2 a manganese dioxide containing coating fluid prepared according to the following prescription using a Mayer bar to form a film and drying the film at 100° C. for 5 minutes to obtain a dried film 20μ thick.

Manganese dioxide 24 parts by weight
Dispersant (Roma PW of S.N Co.) 1 part by weight
Isopropyl alcohol 5 parts by weight
Water 60 parts by weight Aqueous polyurethane resin (P UA 500 of Sanyo Kasei Kogyo Co.) 10 parts by weight The above composition was ball-milled for 24 hours to obtain the coating fluid.

A solid polyelectrolyte layer 4 was formed by applying onto the positive active layer 3 a liquid film of a uniform blend of polyethylene oxide and LiClO4 and drying the film at 100° C. for 3 minutes to form a 5µ thick dried film. The composition of the liquid used to form a solid polyelectrolyte layer 4 was as follows:

Polyethylene oxide (PEO-1 of Seitetsu Kagaku Kogyo Co.) 18.7 parts by weight

LiClO4 8.1 parts by weight

Water 73.2 parts by weight

The above components were churned and mixed to obtain the liquid coating composition which was applied and dried to form the solid polyelectrolyte layer 4.

A negative thin metallic film layer 5 was formed by depositing aluminum 1000 Å thick on the solid polyelectrolyte layer 4 by vacuum deposition.

The layers thus successively coated on the insulating material 1 formed a thin film primary cell 0.0951 mm thick.

A load resistance of 10 kΩ was connected across positive and negative electrodes A, B in FIG. 1 in order to observe the discharge characteristics.

Figure 2:
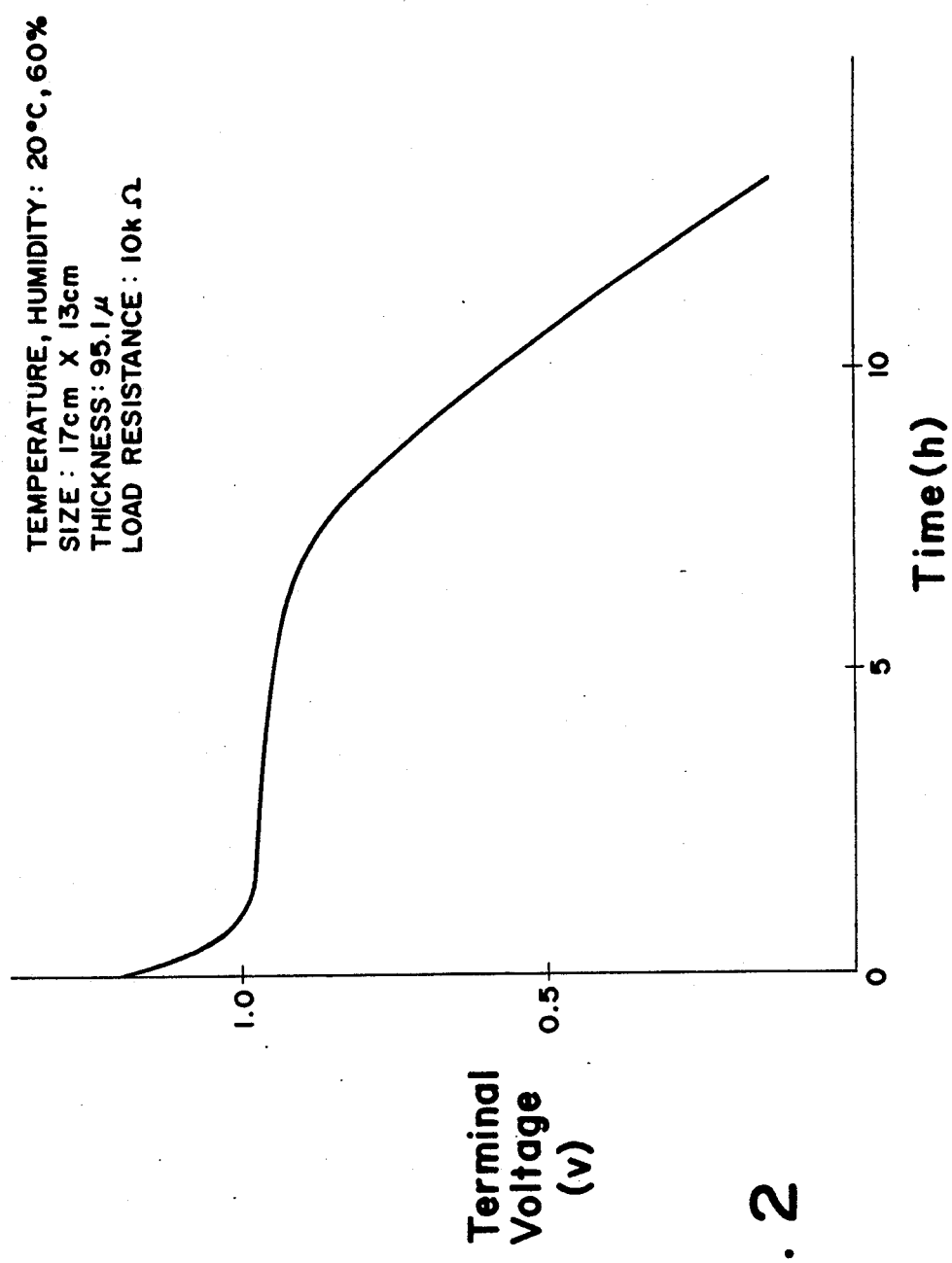

FIG. 2 shows the results obtained.

The performance of the thin film primary cell at 20° C., 60% relative humidity in this embodiment was as follow:

| Size | 17 cm × 13 cm |
|---|---|
| Maximum output | $1 \times 10^{-3}$ W |
| Capacity | $0.91 \times 10^{-2}$ Ah |
| Energy density | 0.92 Wh/kg |

(The capacity and energy density were calculated by timing the drop of the electromotive force to 0.5 V., which voltage was used as a reference).

EXAMPLE 2

Figure 3:
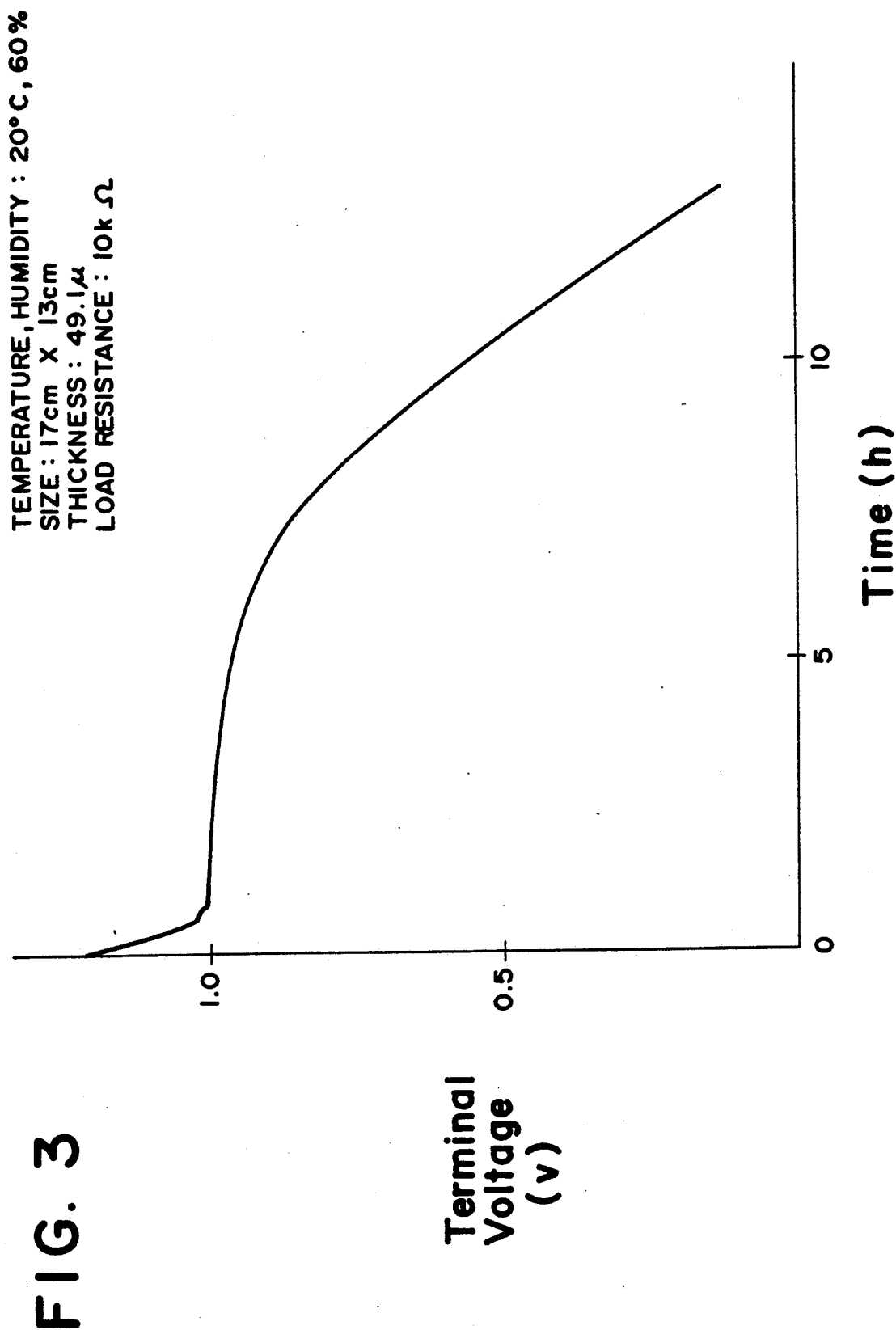

This example employed a cell of the same construction as that of Example 1 except that a polyester film 4µ thick was used as an insulating material 1 and the thin film primary cell was 0.0491 mm thick. FIG. 3 shows its discharge characteristics, which indicate satisfactory performance.

When this thin film primary cell was used at room temperature as a power supply for a pressure sensitive buzzer, it operated satisfactorily for about 10 hours.

EXAMPLE 3

Figure 4:
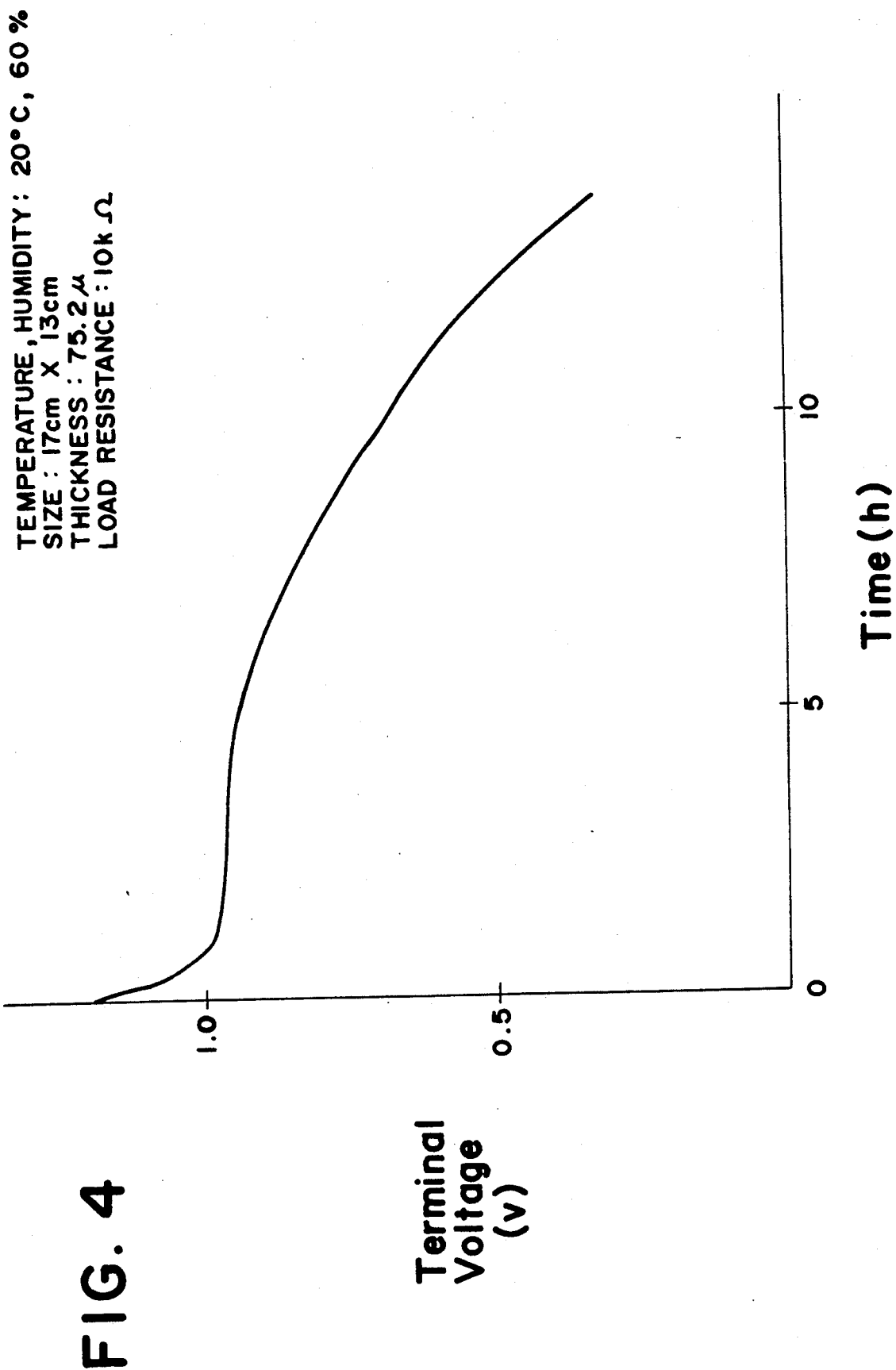

This example employed a cell of the same construction as that of Example 1, except that ITO (Indium-Tin Oxide) alone was used for a positive current collection layer 2, and the cell was 0.0752 mm thick. FIG. 4 shows its discharge characteristics, which indicate satisfactory performance.

EXAMPLE 4

The procedure of Example 1 was repeated except that a blend of the polymer of a methacrylate conforming to the formula I (wherein n=2) and LiClO4 was used to form a solid polyelectrolyte layer 4 which, in turn, was employed to prepare a thin primary cell 0.1051 mm thick.

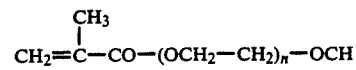

The above methacrylate monomer was first polymerized as follows:

A solution containing the methacrylate monomer of formula I (NK Ester M-20G of Shin Nakamura Kagaku Kogyo Co.) and 30 grams of methylene chloride dissolved therein was churned under a current of nitrogen at atmospheric pressure in a polymerizing tube. Then the solution was further churned at 50° C. for 45 minutes while liquid methylene chloride with 1 gram of 2,2'-azoisobutyro-nitrile dissolved therein was added dropwise.

The reaction liquid was cooled to room temperature and then added to 500 ml of methanol while the blend was being churned in order to precipitate the polymer. The polymer was repeatedly dissolved in methylene chloride and precipitated with methanol for purification. The product was vacuum-dried at 70° C. to obtain a purified polymer.

The viscosity of a methylene chloride solution containing 70% by weight of the polymer was 500 cps (25° C.) as measured by a B-type viscometer.

25.5 grams of the polymer, 4.5 grams of LiClO4 and 70 grams of methylene chloride were blended and churned to obtain a coating liquid, which was then uniformly spread to form a film 15µ thick (after drying). The coating was dried at 100° C. for 5 minutes to obtain the solid polyelectrolyte layer 4.

Figure 5:
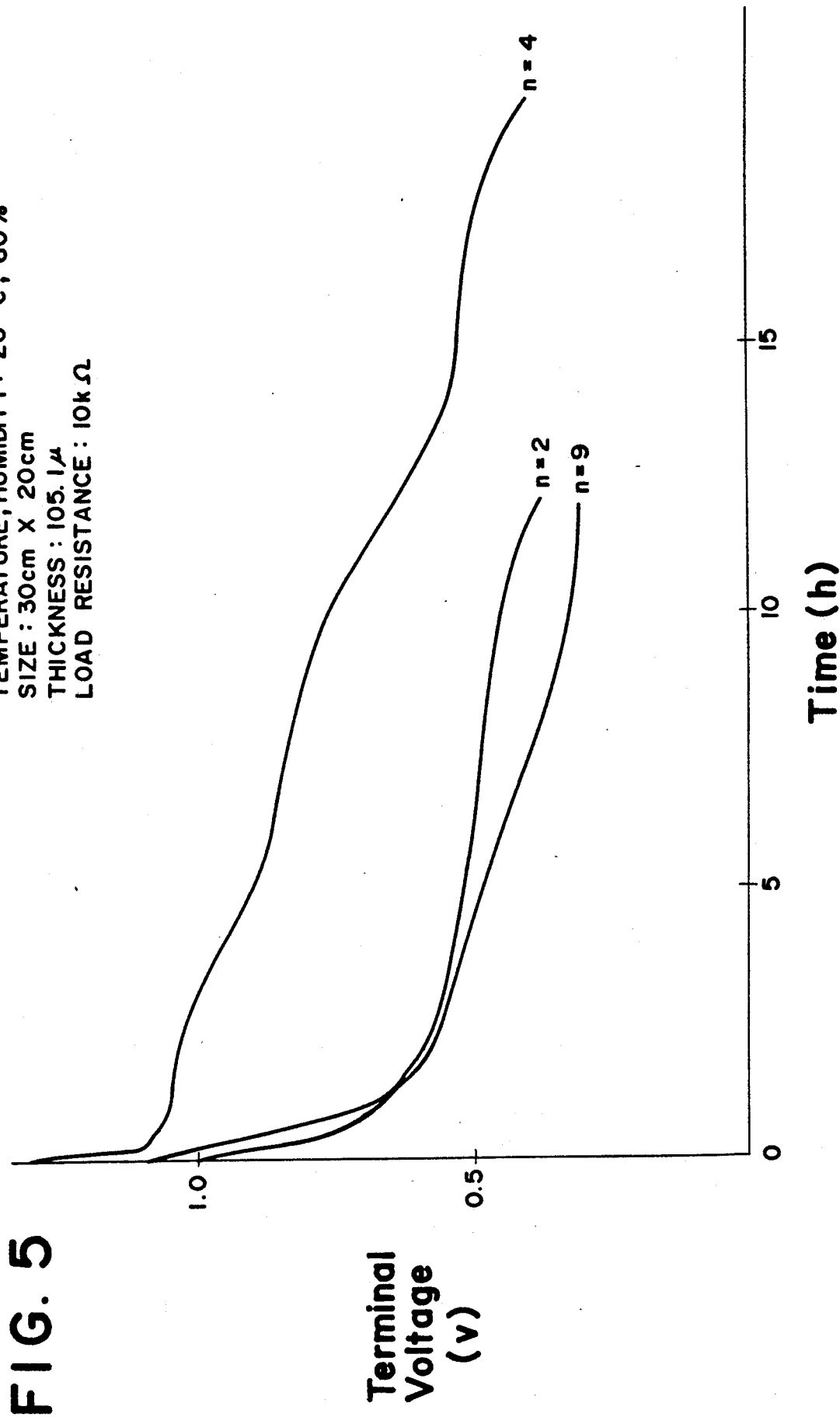

FIG. 5 shows the discharge characteristics of a thin film primary cell 0.1051 mm thick which employed the aforesaid polyelectrolyte layer 4.

Its capacity and energy density were then calculated as follows:

| Capacity (Ah) | $3.6 \times 10^{-3}$ Ah |
|---|---|
| Energy density (Wh/kg) | 38.1 Wh/kg |

(The calculations were based on the timing when the electromotive force dropped to a reference voltage of 0.5 V.)

EXAMPLES 5 AND 6

A polymer (Example 5) of a compound conforming to formula I (n=4) and a polymer (Example 6) of a compound conforming to the formula I (n=9) were used to form solid polyelectrolyte layers 4.

FIG. 5 and Table 1 show the discharge characteristics and performance of the thin film primary cells using the solid polyelectrolyte layers 4 of examples 4, 5 and 6. Again, capacity and energy density were calculated based on the timing when the electromotive force dropped to a reference voltage of 0.5 V. The viscosity was measured by means of a B-type viscometer at 25° C.

TABLE 1

| Ex. | Compound I | Viscosity (cp) | Capacity (Ah) | Energy density (Wh/kg) |
|---|---|---|---|---|
| 4 | n=2 | 500 | $3.6 \times 10^{-3}$ | 38.1 |
| 5 | n=4 | 720 | $1.5 \times 10^{-2}$ | 696.3 |
| 6 | n=9 | 1080 | $3.8 \times 10^{-3}$ | 41.2 |

As is obvious from Table 1, the cell of Example 5 exhibited an extremely high energy density and, when this thin primary cell was used as a power supply for a digital watch at room temperature, it operated accurate to within one second for one year.

EXAMPLE 7

A polyester film 1μ thick was employed as an insulating material 1 and the procedure followed was similar to that of Example 1. The resulting cell had layers of compositions identical to those of example 1 but the thicknesses of the respective layers were different. The positive current collection layer was 2μ thick, the positive active substance layer was 4μ thick and the solid polyelectrolyte layer was 2.9μ thick. The whole primary cell was 0.01 mm thick.

Figure 6:
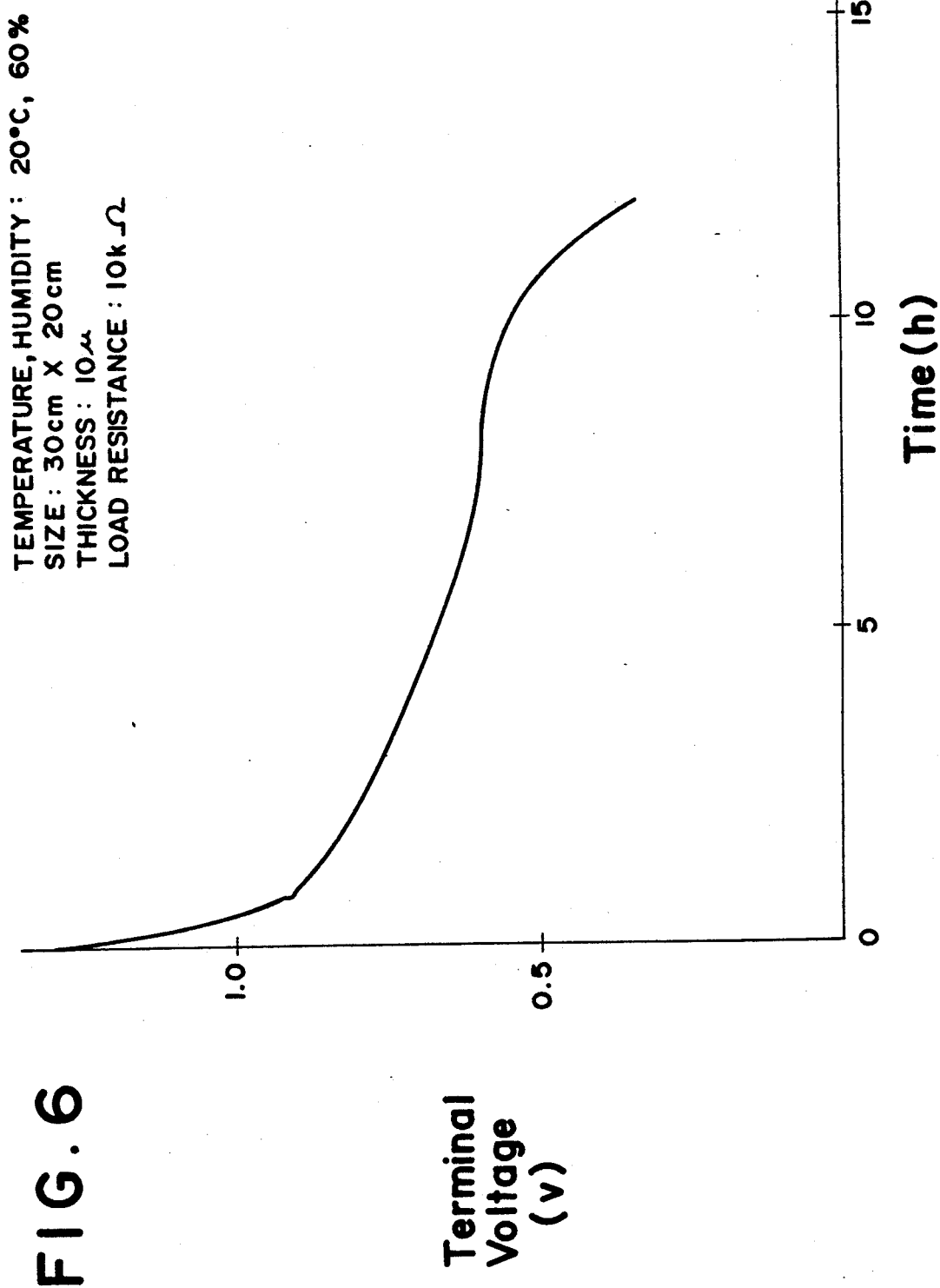

FIG. 6 shows its discharge characteristics, which proved its performance satisfactory.

EXAMPLE 8

A polyester film 50μ thick was employed as an insulating material 1 and use was made of the same procedure as that of Example 1, including making a positive current collection layer 12μ thick of the same composition as that of Example 1, a positive active substance layer 15μ thick of the same composition as that of Example 1 and a solid polyelectrolyte layer 4μ thick of the same composition as that of Example 5, and these layers were successively coated onto the insulating material 1.

Finally, aluminum 15μ thick was laminated on the solid polyelectrolyte layer 4 to form metallic film layer 5. The end product was a thin primary cell 0.096 mm thick.

FIG. 7 shows its discharge characteristics, which prove satisfactory performance.

Thus, there is provided in accordance with the present invention a thin primary cell which has the advantages discussed above. The embodiments described above are intended to be merely exemplary and those skilled in the art will be able to make variations and modifications without departing from the spirit and scope of the invention. All such modifications and variations are contemplated as falling within the scope of the claims.

What is claimed is:

1. A thin primary cell, in the form of at least one ply of a flexible film of a thickness sufficiently thin to allow the film to be cut by scissors to a length providing a selected size and capacity, said film having a thickness of not more than 0.10 mm and consisting of the following layers, in succession:
    a positive current collection layer composed of a first polymer and a particulate conductive material selected from the group consisting of carbon grains, carbon fibers, graphite and metallic oxides dispersed in a matrix of said first polymer and having a thickness of 0.1–20 μm;
    a positive active layer consisting essentially of a particulate manganese dioxide dispersed in a second polymer and having a thickness of 0.1–20 μm;
    a solid polyelectrolyte layer composed of a matrix of a non-crystalline polymer and an alkali metal salt dispersed in said non-crystalline polymeric matrix and having a thickness of 0.1–10 μm; and
    a thin metallic film layer having a thickness of 1–50 μm.

2. A thin primary cell as claimed in claim 1, wherein said positive current collection layer is composed of a metallix oxide and said first polymer.

3. A thin primary cell as claimed in claim 1, wherein said alkali metal salt is a lithium salt.

4. The thin primary cell of claim 1 wherein said non-crystalline polymer is a polymer whose glass point is less than 10° C. and which has active molecular motion at room temperature.

5. The thin primary cell of claim 1 wherein said non-crystalline polymer is selected from the group consisting of polyethylene oxide (PEO), polymethoxy polyethylene glycol methacrylate, polyvinyl pyridine, polysiloxane, polypropylene oxide, segmented polyurethane, urea-polyurethane, polyphosphazene, cellulose, polystyrene and polypeptide.

6. The thin primary cell of claim 1 formed by the process comprising the steps of, in succession:
    coating said substrate with a liquid blend of said first polymer and said particulate conductive material to form said positive current collection layer;
    coating said positive current collection layer with a liquid blend of said particulate manganese dioxide and said second polymer to form said positive active layer;
    coating said positive active layer with a liquid blend of said non-crystalline polymer and said alkali metal salt to form said solid polyelectrolyte layer; and
    coating said solid polyelectrolyte layer with said metallic film by vacuum deposition, sputtering, ion-plating or non-electrolytic plating.

* * * * *

UNITED STATES PATENT AND TRADEMARK OFFICE
CERTIFICATE OF CORRECTION

PATENT NO. : 5,019,467
DATED : May 28, 1991
INVENTOR(S) : Yasuo FUJIWARA It is certified that error appears in the above-identified patent and that said Letters Patent is hereby corrected as shown below:

Col. 4, line 24, delete "cf" and insert --of--.

IN THE CLAIMS:

Col. 8, line 20, delete "metallix" and insert --metallic--.

Signed and Sealed this

Fifteenth Day of December, 1992

*Attest:*

DOUGLAS B. COMER

*Attesting Officer*    *Acting Commissioner of Patents and Trademarks*